(12) United States Patent
Sawada (10) Patent No.: US 7,546,022 B2
(45) Date of Patent: Jun. 9, 2009

(54) TIME SHIFT REPRODUCTION METHOD AND DEVICE AND BOOKMARK BEING USED IN SAME

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 1065 days.

(21) Appl. No.: 10/206,004

(22) Filed: Jul. 26, 2002

(65) Prior Publication Data
US 2003/0021582 A1    Jan. 30, 2003

(30) Foreign Application Priority Data
Jul. 27, 2001   (JP) ............... 2001-228790

(51) Int. Cl.
*H04N 5/76* (2006.01)
*H04N 7/00* (2006.01)
(52) U.S. Cl. .................. 386/68; 386/69; 386/95
(58) Field of Classification Search ............... 386/46, 386/65, 66, 68, 69, 95
See application file for complete search history.

(56) References Cited

U.S. PATENT DOCUMENTS

| 5,504,585 | A | * | 4/1996 | Fujinami et al. ............ 386/111 |
| 5,734,787 | A | * | 3/1998 | Yonemitsu et al. .......... 386/111 |
| 5,740,304 | A |   | 4/1998 | Katsuyama et al. |
| 6,324,335 | B1 | * | 11/2001 | Kanda ........................ 386/52 |
| 6,360,057 | B1 | * | 3/2002 | Tsumagari et al. ............ 386/95 |
| 6,411,771 | B1 | * | 6/2002 | Aotake ........................ 386/52 |
| 6,721,794 | B2 | * | 4/2004 | Taylor et al. ................ 709/231 |
| 6,868,225 | B1 | * | 3/2005 | Brown et al. ................. 386/83 |
| 7,143,353 | B2 | * | 11/2006 | McGee et al. ............... 715/723 |
| 2005/0246738 | A1 | * | 11/2005 | Lockett et al. ............... 725/43 |

FOREIGN PATENT DOCUMENTS

| JP | HEI 7-250305 | 9/1995 |
| JP | 10-134548 | 5/1998 |
| JP | 2000-228790 | 8/2000 |
| JP | 2000-322875 | 11/2000 |

* cited by examiner

*Primary Examiner*—Thai Tran
*Assistant Examiner*—Gelek Topgyal
(74) *Attorney, Agent, or Firm*—Scully, Scott, Murphy & Presser, P.C.

(57) ABSTRACT

A method for reproducing a scene by a time shift is provided in which, by transferring a bookmark created by one viewer to an other viewer, the other viewer can also see a scene that the one viewer desires to see and the scene that the one viewer desires to see can be seen commonly together with the other viewer. To reproduce a recorded moving picture, a scene worthy of note is accessed by using the bookmark. When moving picture information is recorded, picture recording time of a specified screen region is stored in a manner that picture recording actual time of a desired scene is associated with the bookmark and, when reproduction is made, access is made to the scene based on time between picture recording actual time of the scene and of the specified picture screen region and image information of the specified picture screen.

8 Claims, 8 Drawing Sheets

TIME SHIFT REPRODUCTION METHOD AND DEVICE AND BOOKMARK BEING USED IN SAME

BACKGROUND OF THE INVENTION

1. Field of the Invention

The present invention relates to a method for making reproduction of pictures or scenes by accomplishing a time shift for an arbitrary time while temporarily accumulating television signals or a like and a device for the same and a bookmark being used in the above method and the device, and more particularly to the method for reproducing pictures or scenes by accomplishing a time shift and its device which enable a user to jump to a scene that the user wishes to see using the bookmark and, by inputting the bookmark into an other time shift reproduction device, to reproduce pictures or scenes by jumping to a same scene that the user wishes to see in the other time shift reproduction device as well.

The present application claims priority of Japanese Patent Application No. 2001-228790 filed on Jul. 27, 2001, which is hereby incorporated by reference.

2. Description of the Related Art

Figure 13:
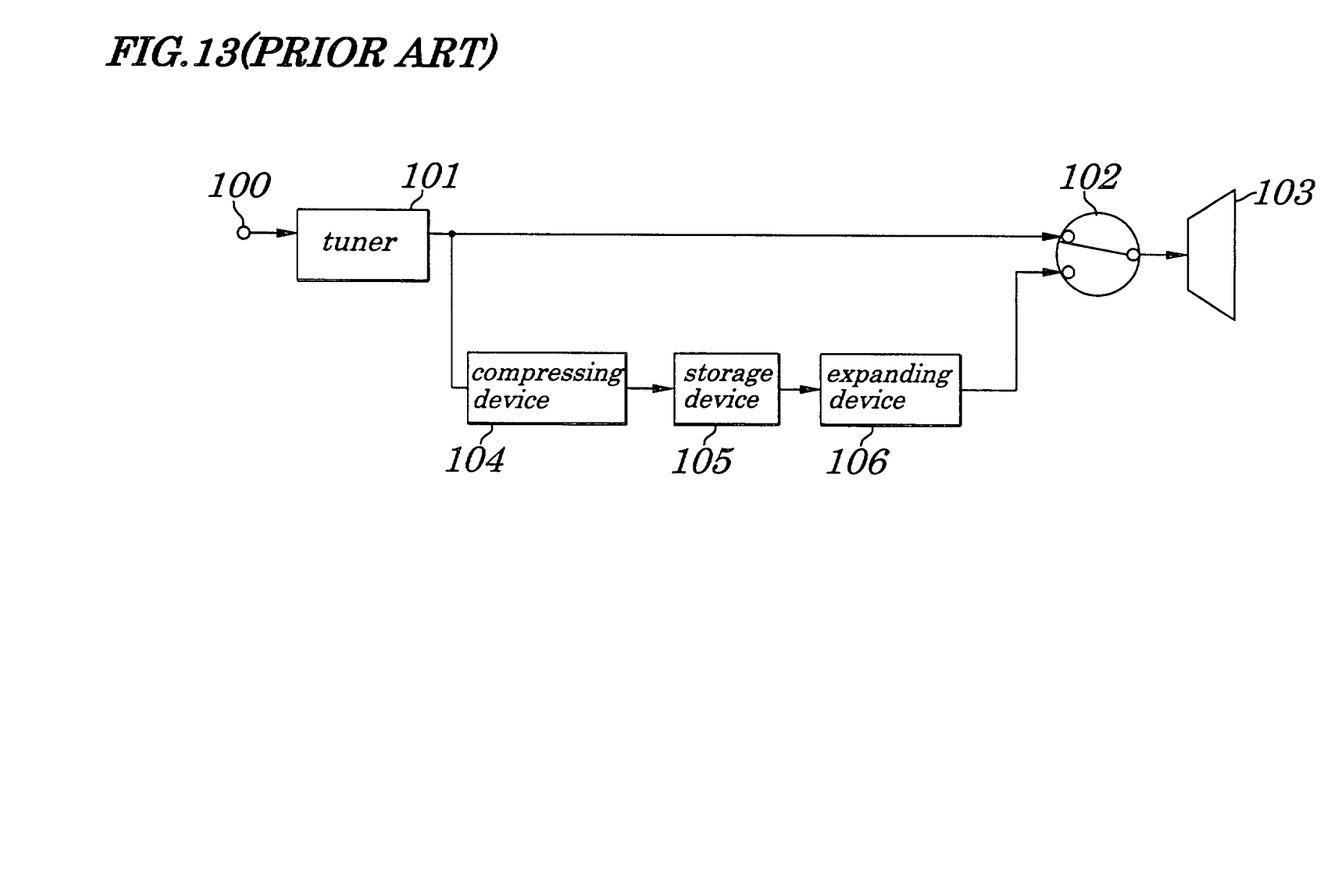
FIG. 13 is a block diagram showing configurations of conventional time shift reproduction device.

A conventional time shift reproduction device is disclosed in Japanese Patent Application Laid-open No. Hei 7-250305. FIG. 13 is a block diagram showing configurations of such the conventional time shift reproduction device. In FIG. 13, a video signal that has been input to an antenna terminal 100, after having been converted to an analog video signal and an analog voice signal in a tuner 101, is displayed through a selecting circuit 102 in a display device 103. Moreover, at the same time, a video signal output from the tuner 101 is fed to a compressing device 104 where a specified amount of information is compressed. The video signal compressed as above is fed to a storage device 105. A video signal being temporarily stored in the storage device 105 is read after a time shift has been accomplished in accordance with requirements of a user and, after having been expanded in an expanding device 106, is displayed through the selecting circuit 102 on the display device 103.

Moreover, as an additional function of the time shift reproduction device of this type, a function is known which is adapted to start reproduction of information by storing a place where a specified video and a specified voice are saved using a bookmark and, after having accomplished a time shift, of having a place jump to the place where the above video and voice are saved, similar to putting a marker between pages of a book.

In such the conventional time shift device, management of a storage medium is performed by a physical address being inherent in each device. Therefore, even if same information is stored by each device, a physical address of the stored information is different for each device in ordinary cases. That is, even when, in one device, information is stored in address "100" (not shown; given as example only) serving as a physical address, in another device, completely different information is stored in ordinary cases. Therefore, even if a place where a video is saved on a storage medium, if the bookmark to identify the place is associated with a physical address being inherent in each device, the bookmark of this type can not be used in an other time shift reproduction device. As a result, a user using the reproduction device of such the kind can not employ that kind of bookmark as a means to introduce a scene desired to be seen to other users having the reproduction device of another type.

SUMMARY OF THE INVENTION

In view of the above, it is an object of the present invention to provide a method for reproducing a signal by accomplishing a time shift and a device for the same and a bookmark to be used in the method and the device which enable a user to input bookmark information fed by others and to reproduce recorded video information being the same as fed by the others.

According to a first aspect of the present invention, there is provided a time shift reproduction method including:

a step of, while moving pictures are recorded on a specified storage medium, storing actual time of recording of at least one frame of a specified moment scene out of the moving pictures being recorded at present on the storage medium;

a step of creating a bookmark indicating actual time of recording of a frame of a scene desired to be seen out of the moving pictures having been recorded on the storage medium; and a step of, when the scene desired to be seen is to be reproduced, obtaining access to or jumping to the frame of the scene desired to be seen by using the bookmark.

In the foregoing first aspect, a preferable mode is one wherein reproduction is made by obtaining access to the frame of the scene desired to be seen based on time between actual time of recording of the frame of the specified moment scene and actual time of recording of the frame of the scene desired to be seen and on information about a place where the frame of the specified moment scene is stored.

Also, a preferable mode is one wherein the scene desired to be seen is identified and accessed by using a time code serving as the information about a place where the scene desired to be seen is stored and being provided to synchronize a video with a voice and by adding the time to the time code.

Also, a preferable mode is one wherein the scene desired to be seen is identified and accessed by using a cumulative number of bits as the information about a place where the scene desired to be seen is stored and by adding a value obtained by multiplying the time by a bit rate to the cumulative number of bits.

Also, a preferable mode is one wherein the scene desired to be seen is identified and accessed by using a cumulative number of frames as the information about a place where the scene desired to be seen is stored and by adding a value obtained by multiplying the time by a frame rate to the cumulative number of frames.

Also, a preferable mode is one wherein actual time of recording of pictures being associated with the bookmark is used when reproduction is made.

According to a second aspect of the present invention, there is provided a bookmark to be used for a time shift reproduction method stated above.

According to a third aspect of the present invention, there is provided a time shift reproduction device for reproducing a recorded moving picture by obtaining access to a specified scene using a bookmark including:

a storing unit to store, when the moving picture is recorded, actual time of recording of at least one frame of a specified moment scene out of the moving;

a bookmark storing section to store actual time of recording of a frame of a scene desired to be seen in a manner that the actual time is associated with the bookmark;

an accessing unit to obtain access to the scene desired to be seen; and wherein the accessing unit obtains access to the frame of the frame of the scene desired to be seen based on time between the actual time of recording of the frame of the specified moment scene and actual time of recording of the frame of the scene desired to be seen and on the information about a place where the frame of the specified moment scene is stored.

In the foregoing third aspect, a preferable mode is one wherein the accessing unit identifies the scene desired to be seen by using a time code serving as the information about a place where the scene desired to be seen is stored and being provided to synchronize a video with a voice and by adding the time to the time code.

Also, a preferable mode is one wherein the accessing unit identifies the frame of the scene desired to be seen by using a cumulative number of bits as the information about a place where the frame of the scene desired to be seen is stored and by adding a value obtained by multiplying the time by a bit rate to the cumulative number of bits.

Also, a preferable mode is one wherein the accessing unit identifies the frame of the scene desired to be seen by using a cumulative number of frames as the information about a place where the frame of the scene desired to be seen is stored and by adding a value obtained by multiplying the time by a frame rate to the cumulative number of frames.

Also, a preferable mode is one wherein actual time of recording of pictures being associated with the bookmark is used when reproduction is made.

According to a fourth aspect of the present invention, there is provided a bookmark to be used for a time shift reproduction device stated above.

With the above configuration, since actual time (absolute time) of recording of pictures for a scene desired to be seen is associated with a bookmark, the bookmark is managed as absolute time. Therefore, this bookmark can be used in a device other than a device that has created this bookmark. As a result, by transferring a bookmark created by one viewer to an other viewer, the other viewer can also see a scene that the one viewer desires to see and the scene that the-one viewer desires to see can be seen commonly together with the other viewer.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
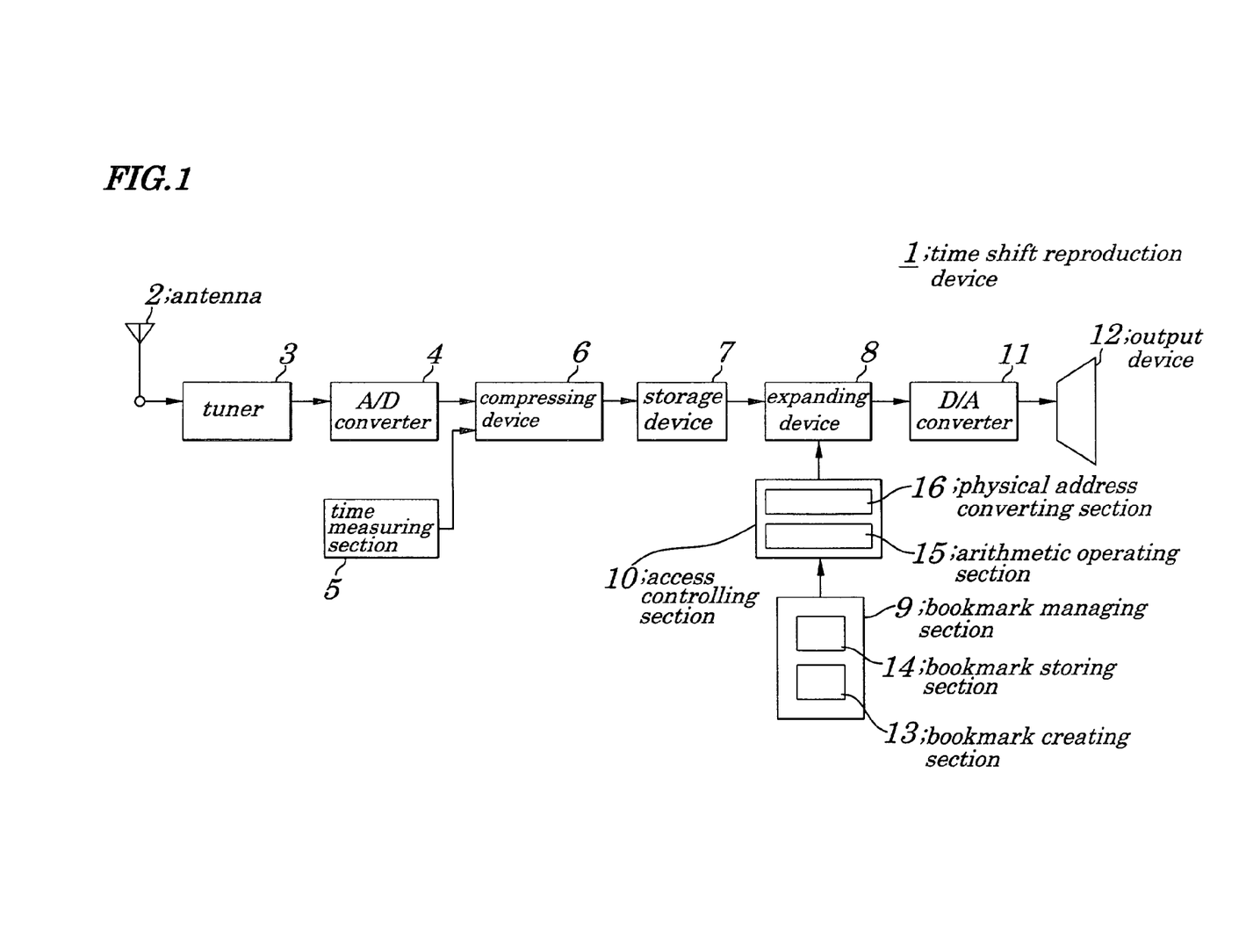
FIG. 1 is a block diagram showing configurations of a time shift reproduction device according to a first embodiment of the present invention.
Figure 2:
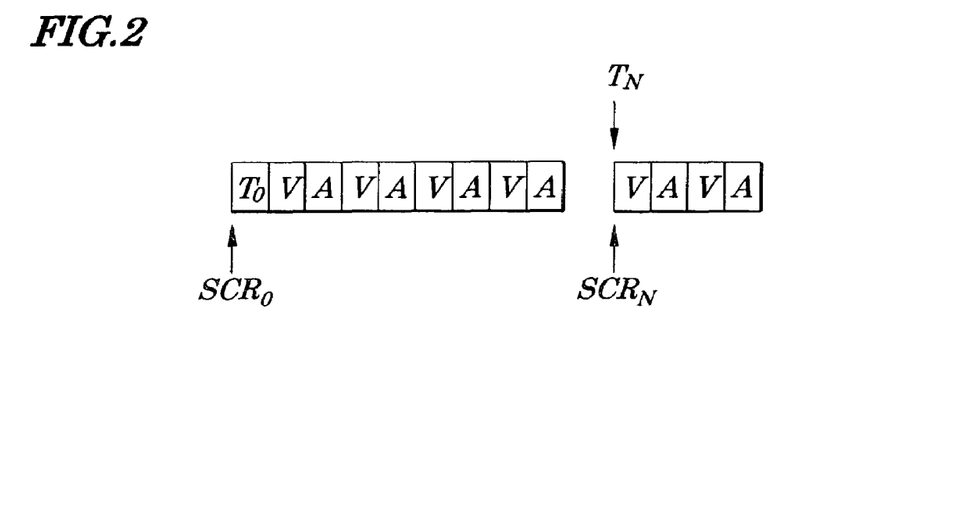
FIG. 2 is a diagram showing configurations of recorded information being used in the first embodiment of the present invention.
Figure 3:
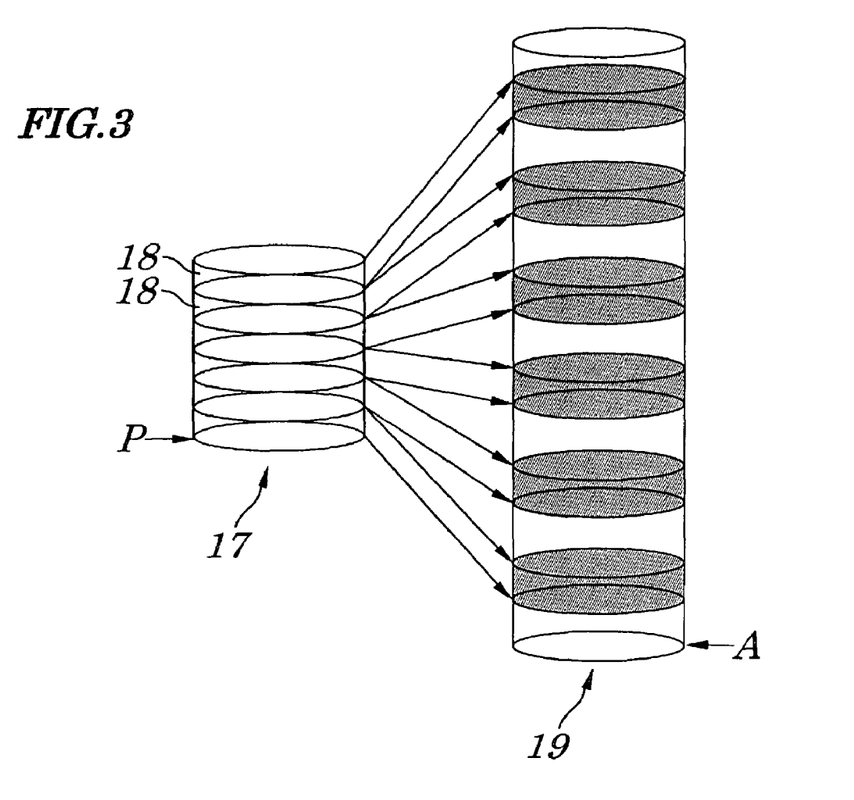
FIG. 3 is a diagram explaining a relation between a time code and a physical address according to the first embodiment of the present invention.
Figure 4:
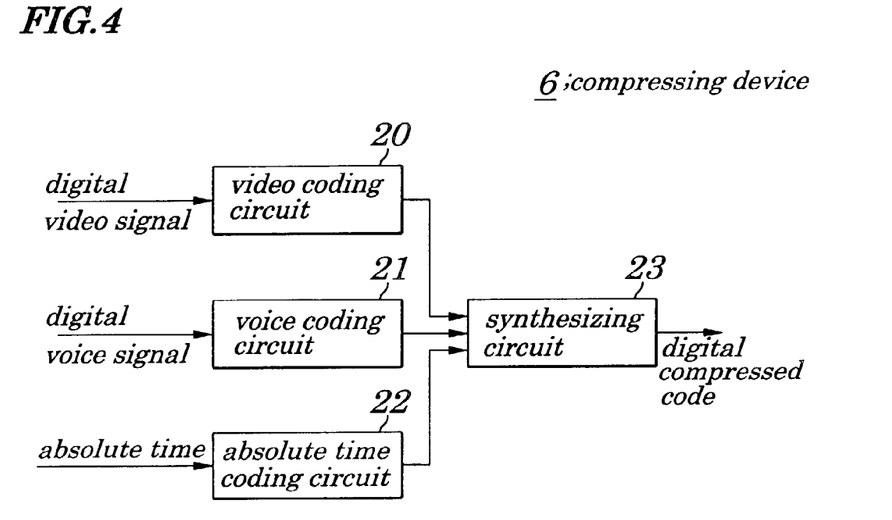
FIG. 4 is a block diagram showing configurations of a compressing device according to the first embodiment of the present invention.
Figure 5:
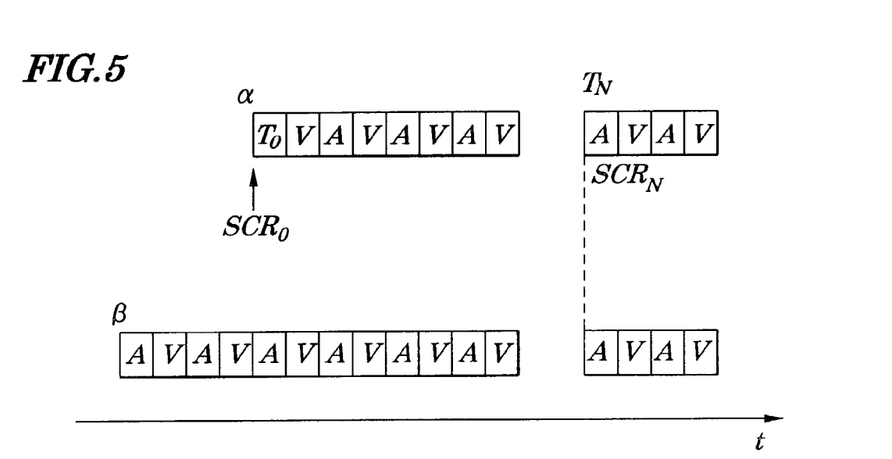
FIG. 5 is a diagram explaining a transfer of a bookmark according to the first embodiment of the present invention.

FIG. 1 is a block diagram showing configurations of a time shift reproduction device 1 of a first embodiment of the present invention. FIG. 2 is a diagram showing configurations of recorded information being used in the first embodiment. FIG. 3 is a diagram explaining a relation between a time code and a physical address of the first embodiment. FIG. 4 is a block diagram showing configurations of a compressing device 6 according to the first embodiment. FIG. 5 is a diagram explaining a transfer of a bookmark according to the first embodiment.

The time shift reproduction device 1 of the embodiment, as shown in FIG. 1, includes an antenna 2 to receive a television signal, a tuner 3 to demodulate a television signal to be an analog video signal and an analog voice signal, an A/D (Analog to Digital) converter 4 to convert these analog video signals and analog voice signals to digital signals, a time measuring section 5, the compressing device 6 to compress an output signal fed from the A/D converter 4 and from the time measuring section 5, a storage device 7 to store an output fed from the compressing device 6, an expanding device 8 to expand an output from the storage device 7, a bookmark managing section 9, an access controlling section 10, a D/A (Digital to Analog) converter 11 to D/A convert an output from the expanding device 8, and an output device 12 to output an analog signal fed from the D/A converter 11. The time measuring section 5, when a moving picture is recorded, measures actual time (absolute time) of recording of at least one frame of a specified moment scene out of the moving pictures being recorded at present, for example, time when the compressing device 6 has started a compressing process (picture recording start time) and outputs them. The actual time of recording of pictures measured by the time measuring section 5 is stored in the storage device 7. Here, the above absolute time is actual time at the time of the measurement, which is measured by the above time measuring section 5 in accordance with, for example, following three kinds of time measuring methods.

(1) Time having a predetermined time zone as local time. One example is Japanese Standard Time (JST).

(2) Time to be used as worldwide standard time. In the past, GreenwichMeanTime (GMT) was used, however, at present, Universal Coordinate Time (UCT) is used.

(3) Time to be used worldwide and commonly without time-zone difference such as Internet time. The Internet time is used as worldwide common time without time-zone difference on the Internet.

The bookmark managing section 9 includes a bookmark creating section 13 and a bookmark storing section 14. The bookmark creating section 13 creates a bookmark. The bookmark functions as a marker which specifies a place where an arbitrary video of a scene desired to be seen and is selected by an audience is stored. In the embodiment, the scene desired to be seen is identified by picture recording actual time which represents time when the scene desired to be seen is recorded. That is, in the embodiment, the bookmark indicates actual time of recording of pictures for a scene desired to be seen. To reproduce a video of a scene, jumping is performed by using the bookmark to reproduce the scene desired to be seen. Therefore, the bookmark creating section 13 solves a following equation (1) to create the bookmark:

$$T_N = T_0 + (SCR_N - SCR_0) \quad \text{Equation (1)}$$

where "$T_0$" denotes picture recording start time to start encoding which is put on a head of a digital compressing code of video information "V" and voice information "A" as shown in FIG. 2, and "$T_N$" denotes actual time of recording of pictures occurring when recording of a scene desired to be seen is started and where "SCR" (System Clock Reference) denotes a time code provided in order to synchronize and reproduce the video information V and the voice information A which serves as information about a place to specify a place where information is stored. Particularly, $SCR_0$ is a time code obtained immediately after the picture recording start time "$T_0$" and $SCR_N$ is a time code to identify a place where a scene desired to be seen is stored. The bookmark creating section 13, when the user manipulates an operation switch (not shown), creates a bookmark indicating the actual time of recording of pictures which enables a scene to be reproduced that is desired to be seen by initiating the above arithmetic operation. That is, the picture recording actual time $T_N$ for the scene desired to be seen can be obtained by solving the above equation (1). The bookmark storing section 14 stores a bookmark created by the bookmark creating section 13.

The access controlling section 10 detects an address of the scene desired to be seen in order to have a scene jump to the desired scene based on the bookmark. The access controlling section 10 includes an arithmetic operating section 15 to solve a following equation (2) in order to create the time code $SCR_N$ corresponding to the scene desired to be seen and a physical address converting section 16 to convert the time code to the physical address of the scene desired to be seen:

$$SCR_N = SCR_0 + (T_N - T_0) \quad \text{Equation (2)}$$

The above equation (2) is obtained by converting the above equation (1). The physical address converting section 16 obtains a physical address corresponding to the above time code SCR. First, as shown in FIG. 3, generally, a picture recording program is managed as a file 17. An address of each file 17 is managed by a relative address (file pointer "P") from a head of the file 17. The file 17 is stored for every block 18 units in a random free space of a storage device 19. Then, the above file pointer P is converted to a physical address in accordance with a specified rule. Moreover, the time code SCR can be searched for by sequentially reading from a head portion of the file 17, that is, from a physical address where the file pointer "P" corresponds to "0 (zero)" and by analyzing it. Therefore, the physical address converting section 16 performs a search for the time code $SCR_N$ by sequentially reading from a head portion of the file 17, that is, from a physical address where the file pointer "P" corresponds to "0 (zero)" and analyzing it. This enables a corresponding physical address of the time code $SCR_N$ to be obtained. Then, the expanding device 8 performs an expanding process of compressed information by having a scene jump to the scene specified by the bookmark, that is, the scene desired to be seen.

The compressing device 6 shown in FIG. 1 compresses digital video signals and digital voice signals output from the A/D converter 4 and an amount of information of absolute time output from the time measuring section 5, and synthesizes the absolute time to be a digital video signal/digital voice signal or makes indexed the absolute time and these signals and outputs them as different data. As a compressing algorithm employed by the compressing device 6, a method such as an MPEG (Moving Picture Experts Group) being an international standard or a like is available. The expanding device 8 reads a digital compressed code being stored in the storage device 7 and performs the expansion. The expanding device 8 has an expanding function corresponding to the compressing algorithm employed by the compressing device 6. Moreover, as a storage medium of the storage device 7, for example, a hard disk device, optical disk device, memory, or a like can be used.

Next, configurations of the compressing device 6 will be described by referring to FIG. 4. The compressing device 6 includes a video coding circuit 20, a voice coding circuit 21, an absolute time coding circuit 22, and a synthesizing circuit 23. The video coding circuit 20 is used to perform compression of digital video signals by using, for example, the MPEG algorithm. The voice coding circuit 21 is used to perform compression of a digital voice signal by using, for example, the MPEG algorithm as in the case of the compression processing on video signals. The absolute time coding circuit 22 is used to encode absolute time fed from the time measuring section 5 adapted to measure the absolute time. The synthesizing circuit 23 is used to synthesize a digital compressed video code, digital compressed voice code, and absolute time code by using, for example, a multiple method of the MPEG algorithm as in the case of the synthesis processing on the video signal.

Next, operations of the time shift reproduction device 1 of the first embodiment will be explained by referring to FIG. 1. A television signal, after having been received by the antenna 2, is input to the tuner 3 and demodulated therein to be an analog video signal and an analog voice signal such as an NTSC (National Television System Committee) signal or a like. Then, a viewer, while seeing a television screen, records a desirable television program from a start of the program or from some midpoint of the program, in an expectation that the viewer would see again the television screens. In this case, the television signals have been converted to digital video signals and digital voice signals by the A/D converter 4, and then an amount of information of the television signals is compressed by the compressing device 6. At this point, start time of the compressing process, that is, picture recording start time is input from the time measuring section 5 to the compressing device 6. This picture recording start time is compressed by the compressing device 6. A digital compressed signal output from the compressing device 6 is stored in the storage device 7. Then, a viewer, while seeing a television screen, if a scene appears that the viewer wants to see again by accomplishing a time shift, manipulates an operation switch of the bookmark creating section 13. Then, the bookmark creating section 13 creates a bookmark indicating actual time of recording of pictures occurring when the scene desired to be seen is recorded and stores the bookmark in the bookmark storing section 14.

Then, a user, when reproducing the picture recorded in the way as above by accomplishing a time shift, has a scene jump to the scene desired to be seen which is specified by the bookmark to reproduce the scene. At this point, a digital compressed code read from the storage device 7, after having been expanded by the expanding device 8 and having been converted to analog video signals and analog voice signals by the D/A converter 11, is reproduced through the output device 12.

In the above descriptions, a case is explained where a bookmark is created by the same time shift reproduction device 1 and where reproduction of the scene desired to be seen is made by having a scene jump to the scene identified by the bookmark. Next, another case is explained where, in another time shift reproduction device 1 being different from the time shift reproduction device 1 described above, the reproduction is made by having a scene jump to the scene desired to be seen identified by the bookmark.

First, let it be assumed, as shown in FIG. 5, that one viewer is seeing a program by using his/her own time shift reproduction device 1 and, at the same time, is recording the same program from picture recording start time "α". Also, let it be assumed that another viewer starts recording of the same program as above from picture recording start time "β" in accordance with, for example, picture recording reservation by using another time shift reproduction device 1. At this point, since both the time shift reproduction devices 1 are recording the same programs, as shown by an arrow in FIG. 5, same absolute time "t" flows through both the time shift reproduction devices 1. Then, when the one viewer reaches a scene that would be desired to be seen by a time shift, this viewer manipulates an operation switch of the bookmark creating section 13. The bookmark creating section 13 creates a bookmark indicating picture recording actual time $T_N$ at that time and the bookmark storing section 14 stores the picture recording actual time $T_N$. Then, the one viewer, in order to recommend the other viewer to see the scene desired to be seen, transfers picture recording actual time $T_N$ to the other viewer. The bookmark $T_N$ can be transferred, for example, through the Internet. The other viewer inputs the bookmark into the bookmark storing section 14 of his/her time shift reproduction device 1. The access controlling section 10, based on the above equation (2), obtains a time code corresponding to a scene desired to be seen and has a scene jump to the scene desired to be seen to start reproduction of the scene.

Thus, the other viewer can see the same program as the one viewer sees. However, in order to transfer the bookmark, as described above, it is necessary that same absolute time "t" flows in both the time shift reproduction devices 1. Therefore, if both the devices are installed domestically in Japan, as the above absolute time "t", the Japanese Standard Time (JST) can be used. If, however, a program such as Olympic Games is broadcast in each country in the world, as the above absolute time "t", the Universal Coordinate Time (UCT) or Internet time described above being used on the Internet, to both of which no considerations to time-zone differences are required, has to be used. Moreover, in the embodiment, a case is described where the SCR is used as a time code, however, same effects can be also achieved by using a PTS (Presentation Time Stamp).

Second Embodiment

Figure 6:
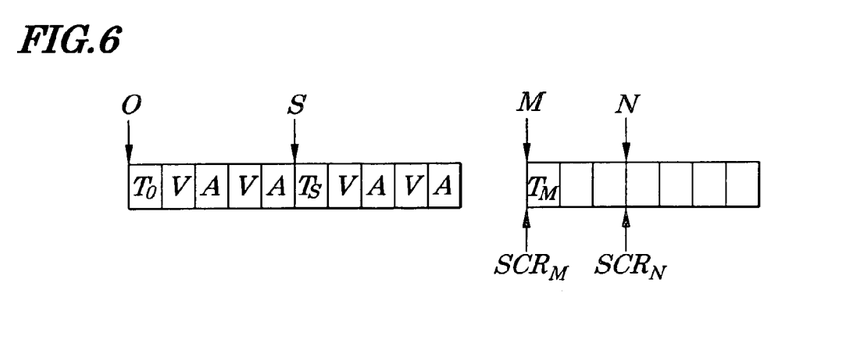
FIG. 6 is a diagram illustrating a relation between a time code at a plurality of reference points and each of picture recording time in a second embodiment of the present invention.

FIG. 6 is a diagram for showing a relation between a time code at a plurality of reference points and picture recording time in a second embodiment of the present invention. In the second embodiment, unlike in the case of the first embodiment, picture recording actual times at picture recording start point "0 (zero), and reference midpoints "S", "M", . . . , as reference points are obtained in advance and are stored and a bookmark at an arbitrary point lies in a point obtained by using a most nearest reference point as a reference. That is, in the second embodiment, as shown in FIG. 6, the picture recording actual time is obtained periodically, for example, once an hour and the obtained picture recording actual time is stored in a storage device 7 together with video and voice information. FIG. 6 shows picture recording actual time $T_0$, $T_S$, and $T_M$ each corresponding to each of the picture recording start point "0 (zero)", and reference midpoints "S", "M", respectively. The above points "0 (zero)", "S", "M", as described above, serve as reference points when a bookmark and a time code are obtained at an arbitrary point, for example, the point "N". Here, though the above points "0 (zero)", "S", "M" are selected as reference points in specified screen regions, other points can be selected.

In a bookmark creating section (not shown) in a bookmark managing section (not shown) according to the second embodiment, when a bookmark $T_N$ indicating picture recording actual time at a point "N" is created, a following equation is solved:

$$T_N = T_M + [SCR_N - SCR_M] \qquad \text{Equation (3)}$$

where $T_M$ is picture recording actual time at the reference point M. The above reference point M, as shown in FIG. 6, is a reference point being nearest to the point "N". Moreover, "$SCR_N$" denotes a time code at the point "N" and "$SCR_M$" denotes a time code at the point M. The above $T_M$ and $SCR_M$ are obtained by replacing N with M given in equations (1) and (2) in the first embodiment. A bookmark storing section 14 in the bookmark managing section 9 stores the bookmark $T_N$.

An access controlling section 10 detects an address of a scene that is desired to be seen to have a scene jump to the scene desired to be seen by a time shift based on the above bookmark. An arithmetic operational section 15 of the access controlling section 10 calculates a time code at a point "N" by solving a following equation (4) obtained by converting the above equation (3) to create the time code corresponding to the scene desired to be seen.

$$SCR_N = SCR_M + (T_N - T_M) \qquad \text{Equation (4)}$$

Moreover, operations by a physical address converting section 16 of the access controlling section 10 to calculate a physical address from the time code of the embodiment are same as in the first embodiment and their operations are omitted accordingly.

Next, operations of the embodiment of the present invention will be described by referring to FIG. 6.

First, while picture recording is being performed, picture recording times at the reference points "0", "S", "M" are stored together with video information stored at these time as shown in FIG. 6. In this state, the bookmark creating section 13, to create a bookmark at the point "N", solves the above equation (3). This bookmark is stored in the bookmark storing section 14. Then, a user, when reproducing a recorded image by accomplishing a time shift, performs the reproduction by having a scene jump to the scene desired to be seen which is specified by the bookmark. At this point, the access controlling section 10 searches for the scene desired to be seen by obtaining the time code $SCR_N$ specified by the bookmark and by obtaining a physical address corresponding to the time code $SCR_N$. Then, image information subsequent to the scene desired to be seen, after having been expanded by an expanding device 8 and having been converted to an analog video signal and an analog voice signal by a D/A converter 11, is reproduced through an output device 12. Moreover, as in the case of the first embodiment, by transferring a bookmark $T_N$ created by one viewer to an other viewer, the other viewer can also see a scene that the one viewer desires to see and the scene that the one viewer desires to see can be seen commonly together with the other viewer and their descriptions are omitted accordingly. In the second embodiment, unlike in the case of the first embodiment, since picture recording time is obtained at a plurality of points each serving as a reference point and stored, and since a bookmark at an arbitrary point can be a point obtained by using a nearest reference point as a reference, errors occurring when the bookmark is being obtained can be reduced as soon as possible.

Third Embodiment

Figure 7:
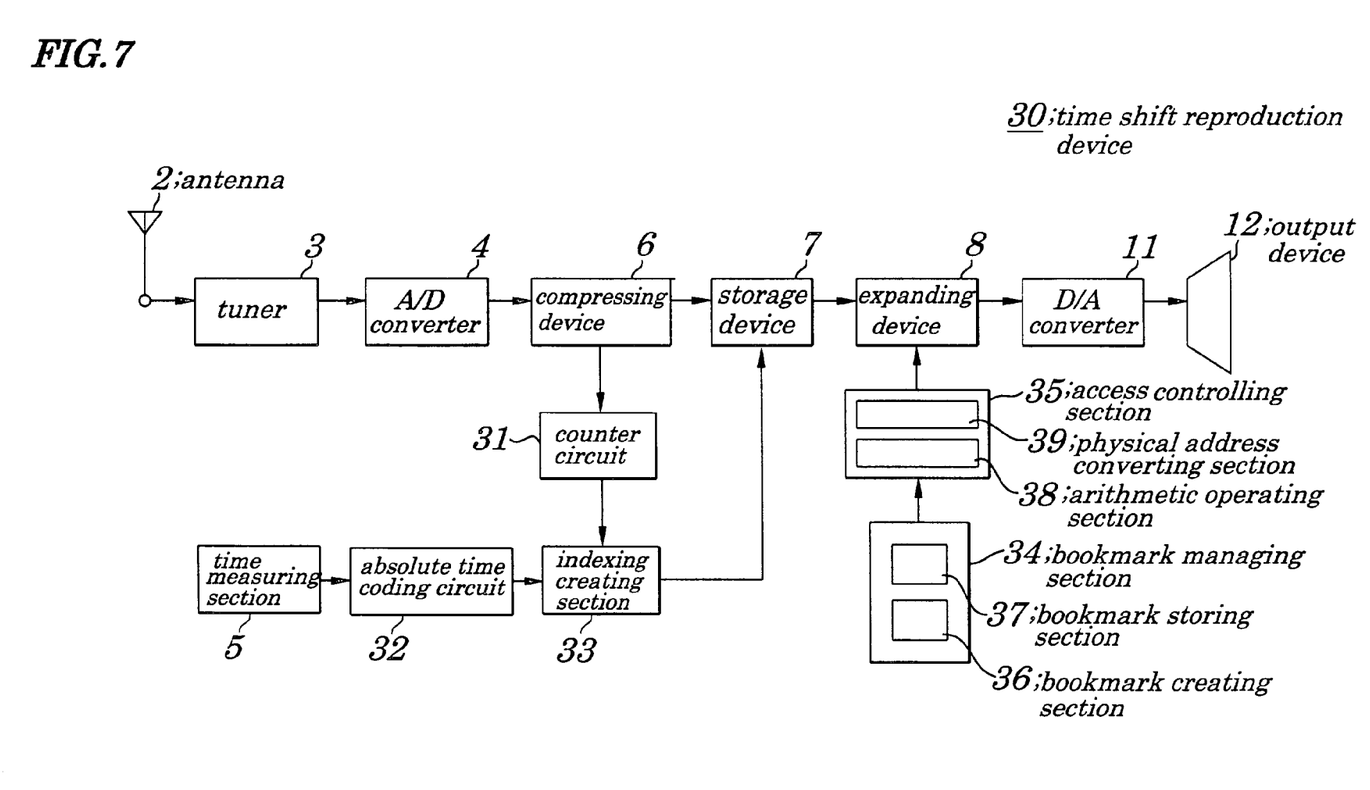
FIG. 7 is a schematic block diagram showing configurations of a time shift reproduction device according to a third embodiment of the present invention.
Figure 8:
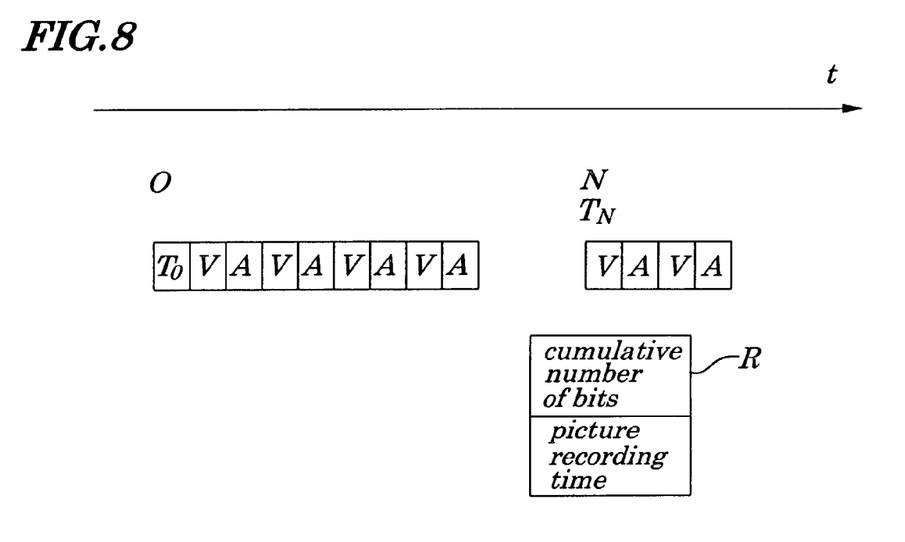
FIG. 8 is a diagram illustrating a relation between a cumulative number of bits and actual time of recording of pictures according to the third embodiment of the present invention.

FIG. 7 is a schematic block diagram showing configurations of a time shift reproduction device 30 of a third embodiment of the present invention. FIG. 8 is a diagram illustrating a relation between a cumulative number of bits and picture recording actual time of the third embodiment. Configurations of the time shift reproduction device 30 are different from those of the time shift reproduction device 1 in that it additionally includes a counter circuit 31, an absolute time coding circuit 32, and an index creating section 33 and it has a bookmark managing section 34 and an access controlling section 35 being different from those employed in the first embodiment. Moreover, in FIG. 7, same reference numbers are assigned to corresponding parts having same functions as those shown in FIG. 1 and their descriptions are omitted accordingly.

In the counter circuit 31, as shown in FIG. 8, a cumulative amount of data of recorded information existing from a picture recording start point "0 (zero)" to an arbitrary point, for example, to a point "N", that is, a cumulative number of bits are counted and are output. A cumulative number of bits $D_N$ serve to provide place information used to identify a place of information being stored. Moreover, the absolute time coding circuit 32 encodes absolute time output from a time measuring section 5 and outputs the encoded absolute time. The index creating section 33 indexes the cumulative number of bits $D_N$ existing from the picture recording start point "0 (zero)" to the point "N" and picture recording actual time $T_N$ at the point "N" and then outputs them as index information "R".

A relation among the picture recording actual time $T_N$, picture recording actual time $T_0$ at the picture recording start point "0 (zero)", and the cumulative number of bits $D_N$ is given by a following equation (5). Therefore, a bookmark creating section 36 in the bookmark managing section 34 solves the equation (5) to create a bookmark $T_N$ indicating the picture recording actual time at the above point "N":

$$T_N = T_0 + D_N/\text{Bit Rate} \quad \text{Equation (5)}$$

where "Bit Rate" denotes a transmission speed of information. A bookmark storing section 37 in the bookmark managing section 34 stores the bookmark $T_N$.

The access controlling section 35 detects an address of a scene desired to be seen to have a scene jump to the scene desired to be seen, based on the bookmark $T_N$, by accomplishing a time shift. An arithmetic operating section 38 in the access controlling section 35, when the reproduction is to be made, calculates the cumulative number of bits $D_N$ at the point "N", to obtain a cumulative number of bits corresponding to the scene desired to be seen by solving a following equation (6) obtained by converting the above equation (5).

$$D_N = +(T_N - T_0) \times \text{Bit Rate} \quad \text{Equation (6)}$$

A physical address converting section 39 in the access controlling section 35 converts the cumulative number of bits to a physical address in a way as described below. That is, cumulative data $D_N$ at the point "N" is matched to a file pointer P described in the first embodiment. As described in the first embodiment, since there is a specified relation between a file pointer P and a physical address, by searching for a physical address serving as the file pointer P, a physical address at the point "N" is specified and a scene desired to be seen can be reproduced by having a physical address jump to the physical address at the point "N".

Next, operations of the time shift reproduction device 30 of the third embodiment will be described by referring to FIG. 8. Let it be assumed that the point "N" is a picture recording start point "0 (zero)" of a scene desired to be seen. In this case, in order to create a bookmark TN at the point "N", the bookmark creating section 36 solves the equation (5). The bookmark TN is stored in the bookmark storing section 37. Then, a user, when reproducing a recorded image by accomplishing a time shift, reproduces the scene by having a scene jump to a scene desired to be seen which is identified by the bookmark $T_N$. At this point, the access controlling section 35 searches for the scene desired to be seen by obtaining a cumulative number of bits serving as the bookmark $T_N$ and obtaining a physical address corresponding to the cumulative number of bits $D_N$. Then, image information subsequent to the scene desired to be seen, after having been expanded by an expanding device 8 and having been converted to an analog video signal and an analog voice signal by a D/A converter 11, is reproduced through an output device 12. Moreover, by transferring a bookmark $T_N$ created by one viewer to an other viewer, the other viewer can also see a scene that the one viewer desires to see and the scene that the one viewer desires to see can be seen commonly together with the other viewer, which are the same as in the case of the first embodiment and their descriptions are omitted accordingly.

Fourth Embodiment

Figure 9:
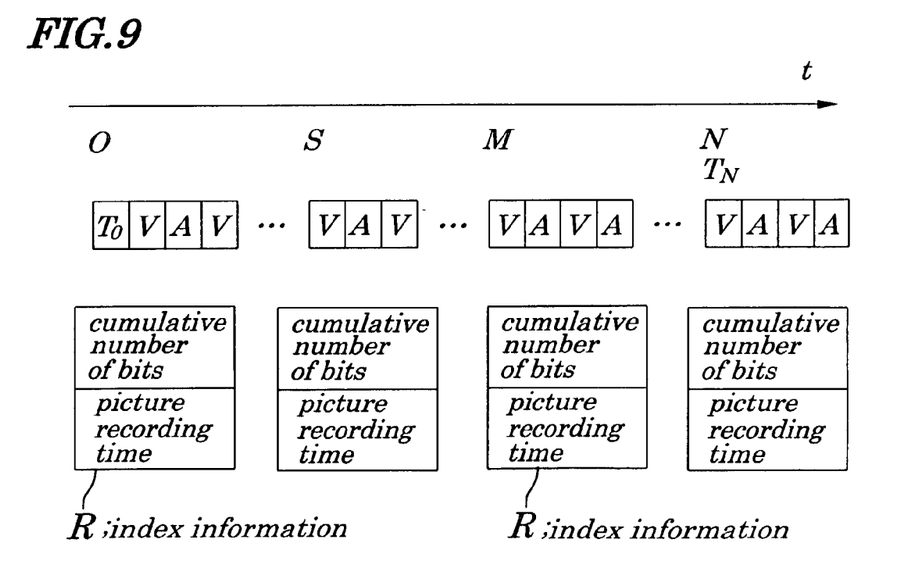
FIG. 9 is a diagram illustrating a relation between a cumulative number of bits and actual time of recording of pictures used as an example in a fourth embodiment of the present invention.

FIG. 9 is a diagram for illustrating a relation between a cumulative number of bits and actual time of recording of pictures used as an example in a fourth embodiment of the present invention. In the fourth embodiment, unlike in the case of the third embodiment, since a cumulative number of bits at a plurality of points S, M, ..., each serving as a reference point from a picture recording start point "0 (zero)" and picture recording actual time at each reference point are obtained in advance and stored as index information "R" and a bookmark at an arbitrary point can be a point obtained by using a nearest reference point as a reference. That is, in the fourth embodiment, an index creating section (not shown), as shown in FIG. 9, obtains index information R periodically, for example, once one hour and stores it together with video information and voice information. In FIG. 9, four pieces of the index information R at each of picture recording start points "0 (zero)", reference midpoints "S", "M", and "N" are shown. As described above, these reference points "0 (zero)", "S", "M", and "N" serve as reference points to be used when the cumulative number of bits at an arbitrary point, for example, at a point "N" is calculated. In the example, though reference points "0 (zero)", "S", "M", and "N" are selected as specified screen region serving as the reference, other points may be selected.

An bookmark creating section (not shown) in a bookmark managing section (not shown) according to the fourth embodiment, when creating a bookmark $T_N$ indicating picture recording time at the point "N", solves a following equation:

$$T_N = T_M + [D_N - D_M]/\text{Bit Rate} \qquad \text{Equation (7)}$$

Where the "Bit Rate" denotes a transmission speed of information and "$T_M$" denotes picture recording time at the above reference point M. As shown in FIG. 9, the reference point M denotes a reference point being nearest to the point "N" and where "$D_N$" denotes a cumulative number of bits occurring from the picture recording start point "0 (zero)" to the point "N" and "DM" denotes a cumulative number of bits occurring from the picture recording start point "0 (zero)" to the point "$N_M$". The bookmark creating section in the bookmark managing section stores the bookmark $T_N$.

An access controlling section (not shown) detects an address of a scene desired to be seen, based on the bookmark, to have a scene jump to the scene desired to be seen by a time shift. An arithmetic operating section (not shown) in the access controlling section calculates a cumulative number of bits at a point "N" by performing an arithmetic operation using a following equation (8) obtained by converting the above equation (7) in order to create information about the cumulative number of bits corresponding to the scene desired to be seen:

$$D_N = D_M + (T_N - T_M) \times \text{Bit Rate} \qquad \text{Equation (8)}$$

Moreover, operations by a physical address converting section (not shown) in the access controlling section to calculate a physical address from the above cumulative number of bits are same as in the third embodiment and their operations are omitted accordingly. Also, as in the case of the first embodiment, by transferring a bookmark $T_N$ created by one viewer to an other viewer, the other viewer can also see a scene that the one viewer desires to see and the scene that the one viewer desires to see can be seen commonly together with the other viewer and their descriptions are omitted accordingly.

Next, operations of the time shift reproduction device (not shown) of the fourth embodiment will be described by referring to FIG. 9. First, at a time of picture recording, arithmetic operation is performed by the index creating section on index information at each of the reference points "0 (zero)", "S", and "M" and then is stored together with video information or alike. In this state, to create a bookmark at the point "N", the bookmark creating section solves the above equation (7). The created bookmark is stored in a bookmark storing section (not shown). Then, a user, when reproducing a recorded image by accomplishing a time shift, reproduces a scene desired to be seen which is identified by the bookmark. At this point, the access controlling section searches for the scene desired to be seen by obtaining a cumulative number of bits $D_N$ corresponding to the bookmark and by obtaining a physical address corresponding to the cumulative number of bits $D_N$. Then, video information subsequent to the scene desired to be seen, after having been expanded by an expanding device 8 and having been converted to an analog video signal and an analog voice signal by a D/A converter 11, is reproduced through an output device 12. By transferring a bookmark $T_N$ created by one viewer to an other viewer, the other viewer can also see a scene that the one viewer desires to see and the scene that the one viewer desires to see can be seen commonly together with the other viewer, which are the same as in the case of the first embodiment and their descriptions are omitted accordingly. In the fourth embodiment, unlike in the case of the third embodiment, since a cumulative number of bits obtained at a plurality of points each serving as a reference point and picture recording time at that time are stored in advance and since a bookmark at an arbitrary point can be a point obtained by using a nearest reference point as a reference, errors occurring when the bookmark is obtained can be reduced as soon as possible.

Fifth Embodiment

Figure 10:
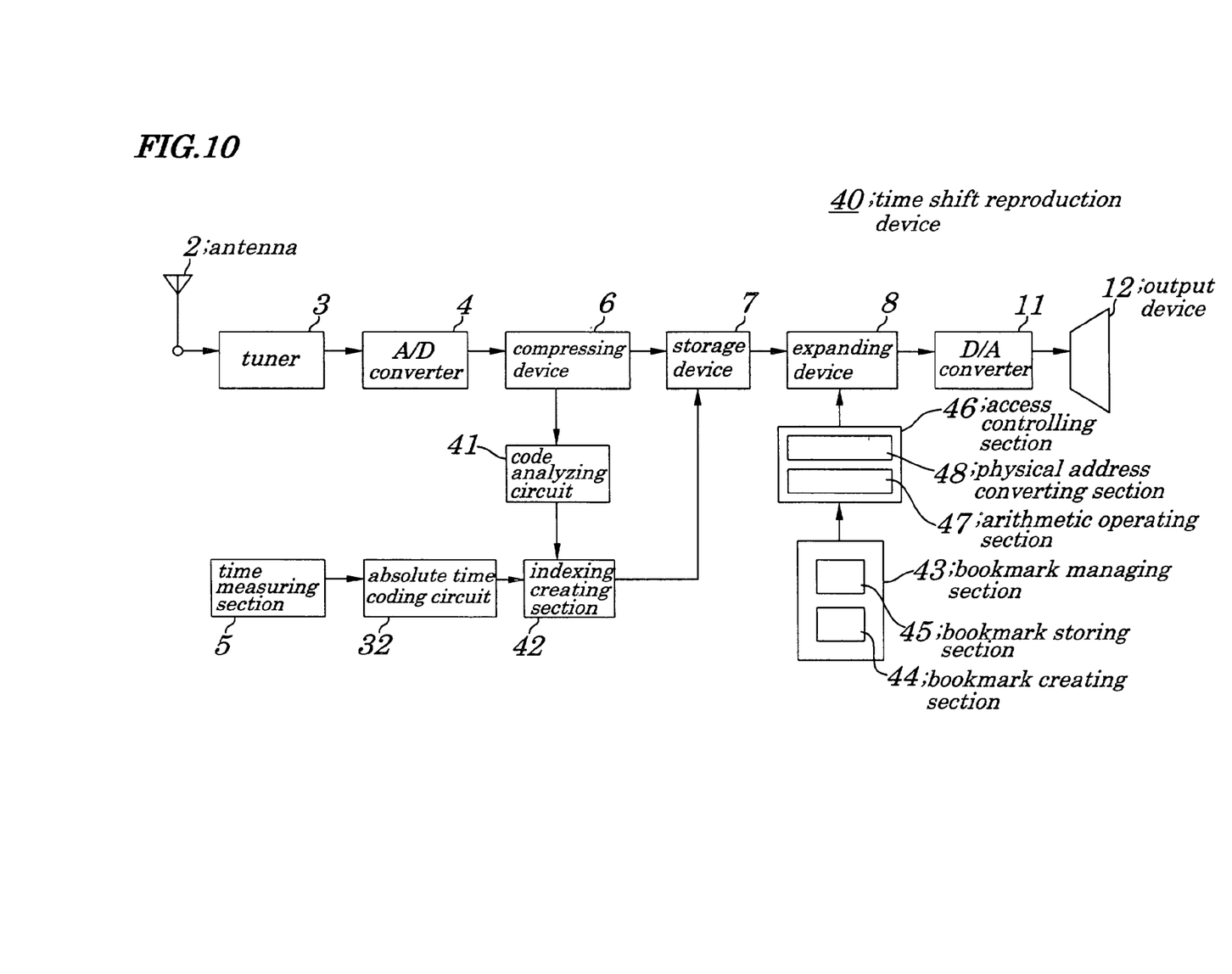
FIG. 10 is a block diagram showing configurations of a time shift reproduction device according to a fifth embodiment of the present invention.
Figure 11:
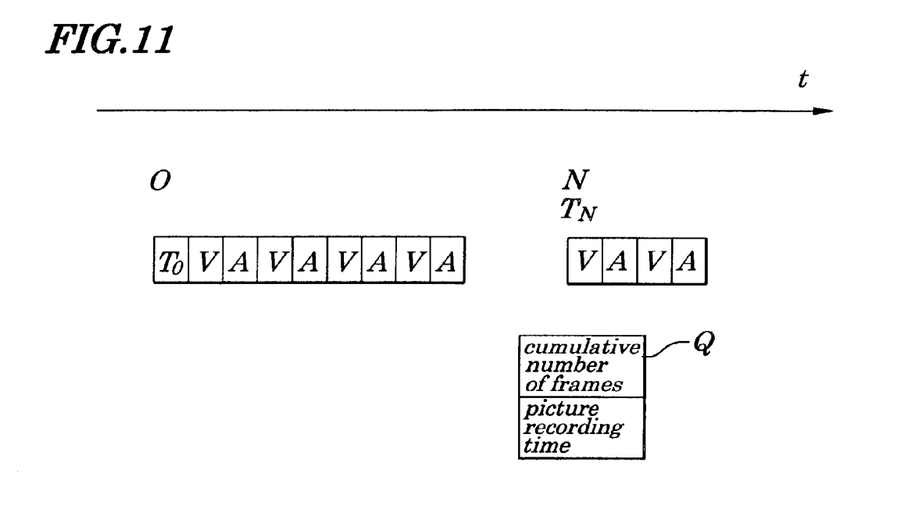
FIG. 11 is a diagram illustrating a relation between a cumulative number of frames and actual time of recording of pictures used as an example in the fifth embodiment of the present invention.

FIG. 10 is a block diagram showing configurations of a time shift reproduction device 40 according to a fifth embodiment of the present invention. FIG. 11 is a diagram illustrating a relation between a cumulative number of bits and picture recording actual time used as an example in the fifth embodiment. Configurations of the time shift reproduction device 40 of the fifth embodiment differ from those in a time shift reproduction device 30 according to the first embodiment of the present invention in that, instead of a cumulative number of bits, a cumulative number of frames is used. Moreover, in FIG. 10, same reference numbers are assigned to corresponding parts having same functions as those shown in the third embodiment and their descriptions are omitted accordingly. The time shift reproduction device 40 in the fifth embodiment employs a code analyzing circuit 41, instead of a counter circuit 31 used in the time shift reproduction device 30.

The code analyzing circuit 41, as shown in FIG. 11, obtains a cumulative frame number $F_N$ of recording of information existing from a picture recording start point "0 (zero)" to an arbitrary point "N" and outputs it. The cumulative number of bits $F_N$ serve to provide place information used to identify a place of information having been stored. An index creating section 42 makes indexed a cumulative number of frames from the picture recording start point "0 (zero)" to an arbitrary point and the picture recording actual time at an arbitrary point, and outputs them as index information "Q" as shown in FIG. 11.

A relation among the picture recording actual time $T_N$, picture recording actual time $T_0$ at the picture recording start point "0 (zero)", and the cumulative number of frames $F_N$ is given by a following equation (9). Therefore, a bookmark creating section 44 of a bookmark managing section 43 solves the equation (9) to create a bookmark $T_N$ indicating the picture recording actual time at the above point "N":

$$T_N = T_0 + F_N/\text{Frame Rate} \qquad \text{Equation (9)}$$

where "Frame Rate" denotes a transmission speed of information. A bookmark storing section 45 of the bookmark managing section 43 stores the bookmark $T_N$.

An access controlling section 46 detects an address for a scene desired to be seen in order to have a scene jump to the desired scene, based on the bookmark $T_N$. An arithmetic operating section 47 in the access controlling section 46, at a time of reproduction of the scene, obtains a cumulative number of frames $F_N$ at the point "N" by solving a following equation (10) obtained by converting the above equation (9) in order to obtain the cumulative number of frames corresponding to the scene desired to be seen.

$$F_N = +(F_N - T_0) \times \text{Frame Rate} \qquad \text{Equation (10)}$$

A physical address converting section 48 in the access controlling section 46 calculates a physical address corresponding to the above cumulative number of frames in a way described below. That is, searching of a cumulative number of frames $F_N$ at the point "N" is achieved by reading frames in sequence from a head of the file described in the first embodiment, that is, from a physical address corresponding to "0 (zero)" of a file pointer and also by counting a number of frames. Thus, a physical address at the point "N" is specified and by having an address jump to the physical address, a scene desired to be seen can be reproduced.

Next, operations of the time shift reproduction device 40 will be explained by referring to FIG. 11. In FIG. 11, let it be assumed that a point "N" is a picture recording start point. At this point, in order to create a bookmark $T_N$ at the point "N", the bookmark creating section 44 solves the equation (9). The created bookmark $T_N$ is stored in the bookmark storing section 45. Then, a user, when reproducing a recorded image by accomplishing a time shift, reproduces the scene by having a scene jump to a scene desired to be seen which is identified by the bookmark $T_N$. At this point, the access controlling section 46 searches for the scene desired to be seen by obtaining a cumulative number of frames $F_N$ serving as the bookmark $T_N$ and obtaining a physical address corresponding to the cumulative number of frames $F_N$. The video information subsequent to the scene desired to be seen, after having been expanded by an expanding device 8 and having been converted to an analog video signal and an analog voice signal by a D/A converter 11, is reproduced through an output device 12. Moreover, by transferring a bookmark $T_N$ created by one viewer to an other viewer, the other viewer can also see a scene that the one viewer desires to see and the scene that the one viewer desires to see can be seen commonly together with the other viewer, which are the same as in the case of the first embodiment and their descriptions are omitted accordingly.

Sixth Embodiment

Figure 12:
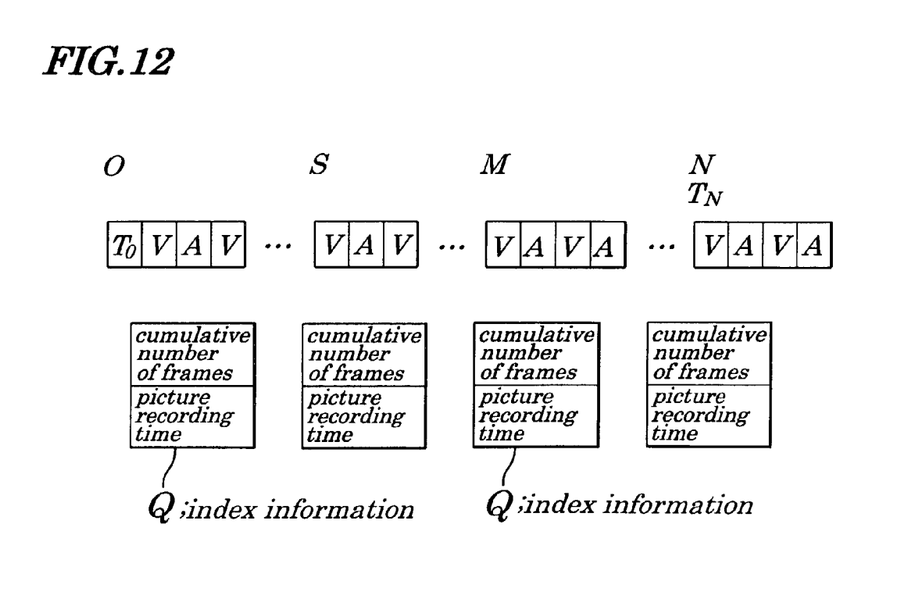
FIG. 12 is a diagram illustrating a relation between a cumulative number of frames and actual time of recording of pictures according to a sixth embodiment of the present invention.

FIG. 12 is a diagram showing operations of a time shift reproduction device 40. In the sixth embodiment, unlike in the case of the fifth embodiment, both a cumulative number of frames obtained at a plurality of points from picture recording start point "0 (zero)" to a plurality of points "S", "M", . . . , and picture recording time at each reference point are obtained in advance and are stored as index information "Q" and a bookmark at an arbitrary point lies at a point obtained by using a nearest reference point as a reference. That is, in the sixth embodiment, as shown in FIG. 12, an index creating section 42 obtains the index information "Q" periodically, for example, once an hour and stores the obtained index information "Q" in a storage device 7 together with video and voice information. FIG. 12 shows index information "Q" obtained at the picture recording start points "0 (zero)", reference midpoints "S", "M" and at the point "N". The above reference points "0 (zero)", "S", "M", as described above, serve as reference points used to obtain a cumulative number of bits at an arbitrary point, for example, at the point "N". As a screen region serving as a reference, though regions obtained at the point "0 (zero)", reference midpoints "S", "M" are selected, a region at an other point can be selected.

A bookmark creating section 44 in a bookmark managing section 43 of the sixth embodiment solves a following equation (11) to create a bookmark $T_N$ indicating a picture recording actual time:

$$T_N = T_M + [F_N - F_M]/\text{Frame Rate} \qquad \text{Equation (11)}$$

where "Frame Rate" denotes a transmission speed of information and "$T_M$" denotes picture recording actual time at the reference point M. Moreover, the reference point M, as shown in FIG. 12, is a reference point being nearest to a point "N". Also, "$F_N$" denotes a cumulative number of frames existing from the picture recording start point "0 (zero)" to the point "N", and "$F_M$" denotes a cumulative number of frames existing from the picture recording start point "0 (zero)" to the reference point "M". A bookmark storing section 45 in the bookmark managing section 43 stores the bookmark $T_N$.

An access controlling section 46 detects an address of the scene desired to be seen in order to have a scene jump to the scene based on the bookmark. An arithmetic operating section 47 in the access controlling section 46 calculates a cumulative number of frames at the point "N" by solving a following equation (12) obtained by converting the above equation (11) to create a time code corresponding to the scene desired to be seen:

$$F_N = F_M + (T_N - T_M) \times \text{Frame Rate} \qquad \text{Equation (12)}$$

Moreover, operations by a physical address converting section 48 in the access controlling section 46 to calculate a physical address from the above cumulative number of frames are same as in the fifth embodiment and their operations are omitted accordingly.

Moreover, by transferring a bookmark $T_N$ created by one viewer to an other viewer, the other viewer can also see a scene that the one viewer desires to see and the scene that the one viewer desires to see can be seen commonly together with the other viewer which are the same as in the case of the first embodiment and their descriptions are omitted accordingly.

Next, operations of the time shift reproduction device 40 will be explained by referring to FIG. 12. First, at a time of picture recording, an arithmetic operation is performed on the index information at reference points "0", "S", "M" and the index information is stored together with video information or a like. In this state, the bookmark creating section 44, to create a bookmark at the point "N", solves the above equation (11). This bookmark is stored in the bookmark storing section 45. Then, a user, when reproducing a recorded image by accomplishing a time shift, reproduces a scene desired to be seen which is identified by the bookmark by having a scene jump to the above scene. At this point, the access controlling section 46 searches for the scene desired to be seen by obtaining a cumulative number of frames $F_N$ serving as the bookmark and obtaining a physical address corresponding to the cumulative number of frames $F_N$. Then, image information subsequent to the scene desired to be seen, after having been expanded by the expanding device 8 and having been converted to an analog video signal and an analog voice signal by the D/A converter 11, is reproduced through an output device 12. By transferring a bookmark $T_N$ created by one viewer to an other viewer, the other viewer can also see a scene that the one viewer desires to see and the scene that the one viewer desires to see can be seen commonly together with the other viewer, which are the same as in the case of the first embodiment and their descriptions are omitted accordingly.

In the sixth embodiment, unlike in the case of the fifth embodiment, since a cumulative number of frames obtained at a plurality of points each serving as a reference point and picture recording time at the point are in advance stored and since a bookmark at an arbitrary point can be a point obtained by using a nearest reference point as a reference, errors occurring when the bookmark is obtained can be reduced as soon as possible.

It is apparent that the present invention is not limited to the above embodiments but may be changed and modified without departing from the scope and spirit of the invention. For example, in the above description, a case is explained in which a television signal is used, however, video signals and signals for a DVD (Digital Video Disk) or a like may be used. The time shift reproduction device may select one television signal out of a plurality of television signals depending on a channel. In this case, by having channel information incorporated as bookmark information, an arbitrary one channel may be selected. Moreover, the time shift reproduction device may be so configured that a moving picture is placed at a different region and is fed from a plurality of image picking-up devices adapted to pick up a same subject. In this case, by having information used to select one picking-up device incorporated as bookmark information, an arbitrary one image picking-up device can be selected.

Furthermore, in the above embodiments, cases are explained in which a frame of a specified moment scene out of recorded pictures is obtained at a picture recording start point "0 (zero)", and reference midpoints "S" and "M", however, arbitrary points may be used.

What is claimed is:

1. A time shift reproduction method comprising:
    a step of, while moving pictures are recorded on a storage medium of a first time shift reproduction device, storing actual time of recording of at least one frame of a specified moment scene out of said moving pictures being recorded at present on said storage medium of said first time shift reproduction device;
    a step of creating a bookmark indicating actual time of recording of a frame of a scene desired to be seen out of said moving pictures having been recorded on said storage medium of said first time shift reproduction device;
    a step of, when said scene desired to be seen is to be reproduced from said first time shift reproduction device, obtaining access to or jumping to said frame of said scene desired to be seen by using said bookmark;
    a step of transferring said bookmark to a storage medium of a second time shift reproduction device; and
    a step of, when said scene desired to be seen is to be reproduced from said second time shift reproduction device, obtaining access to or jumping to said frame of said scene desired to be seen by using said bookmark.

2. The time shift reproduction method according to claim 1, wherein reproduction is made by obtaining access to said frame of said scene desired to be seen based on time between actual time of recording of said frame of said specified moment scene and actual time of recording of said frame of said scene desired to be seen and on information about a place where said frame of said specified moment scene is stored.

3. The time shift reproduction method according to claim 2, wherein said scene desired to be seen is identified and accessed by using a time code serving as said information about a place where said scene desired to be seen is stored and being provided to synchronize a video with a voice and by adding said time to said time code.

4. The time shift reproduction method according to claim 2, wherein actual time of recording of pictures being associated with said bookmark is used when reproduction is made.

5. A method for using a bookmark in a time shift reproduction method, said method comprising:
    a step of, while moving pictures are recorded on a storage medium of a first time shift reproduction device, storing actual time of recording of at least one frame of a specified moment scene out of said moving pictures being recorded at present on said storage medium of said first time shift reproduction device;
    a step of creating a bookmark indicating actual time of recording of a frame of a scene desired to be seen out of said moving pictures having been recorded on said storage medium of said first time shift reproduction device;
    a step of, when said scene desired to be seen is to be reproduced from said first time shift reproduction device, obtaining access to or jumping to said frame of said scene desired to be seen by using said bookmark, said reproduction is made by obtaining access to said frame of said scene desired to be seen based on time between actual time of recording of said frame of said specified moment scene and actual time of recording of said frame of said scene desired to be seen and on information about a place where said frame of said specified moment scene is stored;
    a step of transferring said bookmark to a storage medium of a second time shift reproduction device; and
    a step of, when said scene desired to be seen is to be reproduced from said second time shift reproduction device, obtaining access to or jumping to said frame of said scene desired to be seen by using said bookmark.

6. A time shift reproduction system including at least first and second time shift reproduction devices using a same specified time coordinate system, for reproducing a recorded moving picture by obtaining access to a specified scene using a bookmark, each device comprising:
    a storing unit to store, when said moving picture is recorded, a first actual time of recording of at least one frame of a specified moment scene out of said moving picture being recorded at present, the first actual time in a specified time coordinate system;
    a bookmark storing section to store a second actual time of recording of a frame of a scene desired to be seen in a manner that said second actual time is associated with said bookmark, the second actual time in said specified time coordinate system; and
    an accessing unit to obtain access to said scene desired to be seen comprising an arithmetic operating section for creating a time code corresponding to the scene desired to be seen and a physical address converting section for converting the time code to the physical address of the scene desired to be seen, said accessing unit obtains access to said frame of said scene desired to be seen based on time between said first actual time of recording of said frame of said specified moment scene and said second actual time of recording of said frame of said scene desired to be seen and on said information about a place where said frame of said specified moment scene is stored,
    wherein said bookmark is transferred from the first time shift reproduction device to the second time shift reproduction device as a start point of playback by the second time shift reproduction device by which the same moving picture has also been recorded at a same period of time.

7. The time shift reproduction device according to claim 6, wherein said accessing unit identifies said scene desired to be seen by using a time code serving as said information about a place where said scene desired to be seen is stored and being provided to synchronize a video with a voice and by adding said time to said time code.

8. The time shift reproduction device according to claim 6, wherein said second actual time of recording of pictures being associated with said bookmark is used when reproduction is made.

* * * * *